US008159473B2

(12) United States Patent
Cheng et al.

(10) Patent No.: US 8,159,473 B2
(45) Date of Patent: Apr. 17, 2012

(54) METHOD FOR DETECTING TOUCH POINT AND TOUCH PANEL USING THE SAME

(75) Inventors: Wei-Chung Cheng, Hsin-Chu County (TW); Cheng-Chin Liu, Tai-Chung County (TW)

(73) Assignee: Orise Technology Co., Ltd., Hsinchu (TW)

( * ) Notice: Subject to any disclaimer, the term of this patent is extended or adjusted under 35 U.S.C. 154(b) by 558 days.

(21) Appl. No.: 12/392,568

(22) Filed: Feb. 25, 2009

(65) Prior Publication Data

US 2010/0117982 A1 May 13, 2010

(30) Foreign Application Priority Data

Nov. 13, 2008 (TW) .............................. 97143778 A

(51) Int. Cl.
*G06F 3/045* (2006.01)

(52) U.S. Cl. ..................... 345/174; 345/173; 178/18.01; 178/18.05

(58) Field of Classification Search .................. 345/173, 345/174; 178/18.01, 18.05
See application file for complete search history.

(56) References Cited

U.S. PATENT DOCUMENTS

| | | | | |
|---|---|---|---|---|
| 5,534,892 | A * | 7/1996 | Tagawa | 345/173 |
| 2006/0244736 | A1 * | 11/2006 | Tseng | 345/173 |
| 2008/0062148 | A1 * | 3/2008 | Hotelling et al. | 345/174 |
| 2008/0129898 | A1 | 6/2008 | Moon | |
| 2008/0150906 | A1 * | 6/2008 | Grivna | 345/173 |

* cited by examiner

*Primary Examiner* — Adam R Giesy
(74) *Attorney, Agent, or Firm* — Muncy, Geissler, Olds & Lowe, PLLC

(57) ABSTRACT

The present invention relates to a method for detecting touch points and a touch panel using the same. The method includes the steps of: providing a resistive pressure-sensing matrix includes M X-axis sensing lines and N Y-axis sensing lines, wherein the $i^{th}$ X-axis sensing line and the $j^{th}$ Y-axis sensing line are short-circuited when a preset range covering an overlapped region between the $i^{th}$ X-axis sensing line and the $j^{th}$ Y-axis sensing line is pressed; applying a scanning voltage to the $p^{th}$ Y-axis sensing line in a $p^{th}$ scanning period; detecting the M X-axis sensing lines to judge whether the scanning voltage is detected; and determining a touch coordinate as (q, p) when the $q^{th}$ X-axis sensing line receives the scanning voltage in the $p^{th}$ scanning period, wherein M, N, i, p and q are positive integers, 0<i, q<=M and 0<p<=N.

5 Claims, 5 Drawing Sheets

430
VREF
GND
AMP1
AMP2
AMP3
AMP4
AMP5
PY1 NY1 PY2 NY2 PY3 NY3 PY4 NY4 PY5 NY5
Sequence
scan driver
SX1 SX2 SX3 SX4
LY1 LY2 LY3 LY4
SW1-1 SW1-2 SW1-3 SW1-4 SW1-5
E
SW2-1 SW2-2 SW2-3 SW2-4 SW2-5
SW3-1 SW3-2 SW3-3 SW3-4 SW3-5
SW4-1 SW4-2 SW4-3 SW4-4 SW4-5
LX1 LX2 LX3 LX4 LX5
420
410

METHOD FOR DETECTING TOUCH POINT AND TOUCH PANEL USING THE SAME

This application claims priority of No. 097143778 filed in Taiwan R.O.C. on Nov. 13, 2008 under 35 USC 119, the entire content of which is hereby incorporated by reference.

BACKGROUND OF THE INVENTION

1. Field of Invention

The present invention relates in general to the touch panel technology, and more particularly to the technology of detecting touch points on a touch panel.

2. Related Art

Recently, the applications of touch panels have become wider and wider due to the popularization of electronic products. For example, the touch panels have been used in mobile phones, personal digital assistants and notebook computers to serve as input interfaces. More particularly, the touch panels have further been applied to the typical home appliance products, such as refrigerators, washing machines and the like. Thus, it is obtained that the touch panel technology has become a rapidly grown application in the market.

In the touch panel technology, a resistive touch panel is mostly frequently used. FIG. 1 is a side view showing a conventional resistive touch panel. Referring to FIG. 1, the resistive touch panel includes an upper plate 110, a lower plate 120, and an insulating spacer 130 interposed between the upper plate 110 and the lower plate 120 so that the upper plate 110 is insulated from the lower plate 120 when the touch panel is not pressed. FIG. 2 is a top view showing the conventional resistive touch panel. As shown in FIG. 2, the X-axis and the Y-axis are driven by a pair of voltages ranging from 0 to 5V. When the resistive touch panel is touched by the user's hand or a touch pen, a touch point on the touch panel is pressed to make the upper and lower plates contact with each other. Because the loop on the contact point between the upper and lower plates is turned on, a voltage drop is generated. A controller of the touch panel calculates the ratio of the voltage drop, and then further calculates the coordinate.

However, when two touch points exist on the touch panel, only a voltage drop is generated on the touch panel so that the controller only can calculate the coordinate of one contact point according to the voltage drop. In addition, the coordinate calculated by the controller is also not the coordinate of the actual touch point on the touch panel. In other words, the technology of the conventional resistive touch panel cannot detect multiple touch points on the touch panel.

In addition, U.S. Patent Publication No. US-2008/0129898 A1 discloses the detection technology for the touch panel. FIG. 3 is a system block diagram showing a touch panel disclosed in U.S. Patent Publication No. US-2008/0129898 A1. Referring to FIG. 3, the touch panel has many X-axis sensing lines and many Y-axis sensing lines. In addition, each of the regions, in which the X-axis sensing line and the Y-axis sensing line overlap with each other, has a sensor spacer 92 to which a voltage is applied. The Y-axis sensing lines are respectively coupled to the positive input terminals of the comparators AMP1_1 to AMP1_4, and the X-axis sensing lines are respectively coupled to the positive input terminals of the comparators AMP2_1 to AMP2_5. The negative input terminals of the comparators AMP1_1 to AMP1_4 and AMP2_1 to AMP2_5 are coupled to a reference voltage Vref. When a certain region (e.g., the region A) is pressed, the sensor spacer 92 in the region A makes the X-axis sensing line and the Y-axis sensing line in the region A be short-circuited, and the voltage of the sensor spacer 92 is provided to the X-axis sensing line and the Y-axis sensing line. Therefore, the voltages of the positive input terminals of the comparators AMP1_1 and AMP2_4 are changed so that the voltages outputted from the comparators AMP1_1 and AMP2_4 are changed and the position of the touch point in the region A may be detected.

According to the above-mentioned operation, however, it is obtained that when the regions A and B are simultaneously touched and pressed, the output voltages of the comparators AMP1_1, AMP2_4, AMP1_3 and AMP2_1 are changed. Therefore, the controller of the touch panel may judge that the touch points are in the regions A and B, and may also judge that the touch points are in the regions C and D so that the controller cannot correctly judge the positions of the touch points. Therefore, the above-mentioned touch panel cannot implement the multi-point detection technology due to the restriction of the circuit design.

SUMMARY OF THE INVENTION

It is therefore an objective of the present invention to provide a touch panel and a method for detecting touch points on the touch panel correctly and solving the problem of misjudging the positions of the touch points.

To achieve the above-identified or other objectives, the present invention provides a touch panel including a resistive pressure-sensing matrix, a sequence scan driver and M X-axis sensing circuits. The resistive pressure-sensing matrix includes M X-axis sensing lines and N Y-axis sensing lines. The $i^{th}$ X-axis sensing line and the $j^{th}$ Y-axis sensing line are short-circuited when a preset range covering an overlapped region between the $i^{th}$ X-axis sensing line and the $j^{th}$ Y-axis sensing line of the resistive pressure-sensing matrix is pressed. The sequence scan driver has N driving terminals respectively coupled to the N Y-axis sensing lines. The $k^{th}$ X-axis sensing circuit is coupled to the $k^{th}$ X-axis sensing line. A sensing period of the touch panel is divided into N scanning periods, and the $p^{th}$ driving terminal of the sequence scan driver outputs a scanning voltage in the $p^{th}$ scanning period. The $q^{th}$ X-axis sensing circuit receives the scanning voltage so that a touch coordinate is determined as (q, p) when the preset range covering the overlapped region between the $p^{th}$ Y-axis sensing line and the $q^{th}$ X-axis sensing line is pressed in the $p^{th}$ scanning period, wherein M, N, i, j, k, p and q are positive integers, i ranges between 1 and M, j ranges between 1 and N, k ranges between 1 and M, q ranges between 1 and M, and p ranges between 1 and N.

In the touch panel according to the preferred embodiment of the present invention, each of the M X-axis sensing circuits includes a comparator. The comparator of the $k^{th}$ X-axis sensing circuit has a first input terminal, a second input terminal and an output terminal. The first input terminal is coupled to a reference voltage. The second input terminal is coupled to the $k^{th}$ X-axis sensing line. The comparator compares a voltage of the $k^{th}$ X-axis sensing line with the reference voltage, and judges whether the scanning voltage is received according to a compared result. In addition, the sequence scan driver sequentially outputs the scanning voltages from the N driving terminals.

In addition, the present invention further provides a method for detecting a plurality of touch points. The method includes the steps of: providing a resistive pressure-sensing matrix, which comprises M X-axis sensing lines and N Y-axis sensing lines, wherein the $i^{th}$ X-axis sensing line and the $j^{th}$ Y-axis sensing line are short-circuited when a preset range covering an overlapped region between the $i^{th}$ X-axis sensing line and the $j^{th}$ Y-axis sensing line of the resistive pressure-sensing matrix is pressed; applying a scanning voltage to the $p^{th}$ Y-axis sensing line in a $p^{th}$ scanning period; detecting the M X-axis sensing lines to judge whether the scanning voltage is detected; and determining a touch coordinate as (q, p) when the $q^{th}$ X-axis sensing line receives the scanning voltage in the $p^{th}$ scanning period, wherein M, N, i, j, p and q are positive integers, i ranges between 1 and M, j ranges between 1 and N, q ranges between 1 and M, and p ranges between 1 and N.

In the method for detecting the touch points according to the preferred embodiment of the present invention, the step of detecting the M X-axis sensing lines to judge whether the scanning voltage is detected includes: providing a reference voltage; and comparing voltages of the X-axis sensing lines with the reference voltage.

The spirit of the present invention is to sequentially output the scanning voltages to the Y-axis sensing lines, and to detect whether the X-axis sensing lines receive the scanning voltages in each scanning period. Thus, when the $q^{th}$ X-axis sensing line receives the scanning voltage in the $p^{th}$ scanning period, the present invention can correctly detect the position of the touch point and prevent the misjudgment from occurring. In addition, when the touch panel has many touch points, the present invention still can correctly detect the position of each touch point without the misjudgment.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
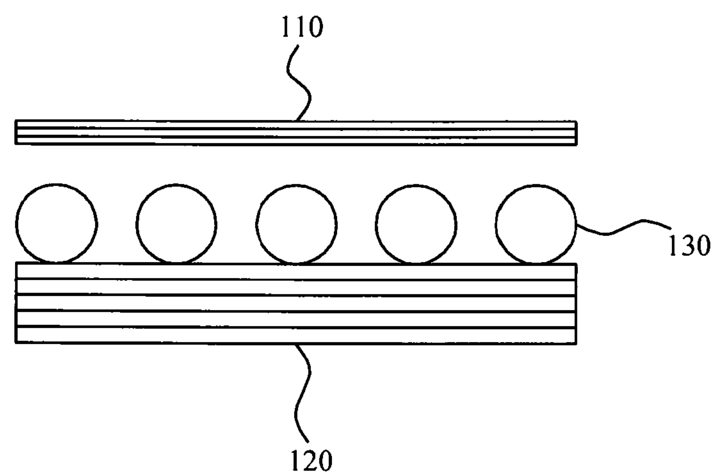
FIG. 1 is a side view showing a conventional resistive touch panel.
Figure 2:
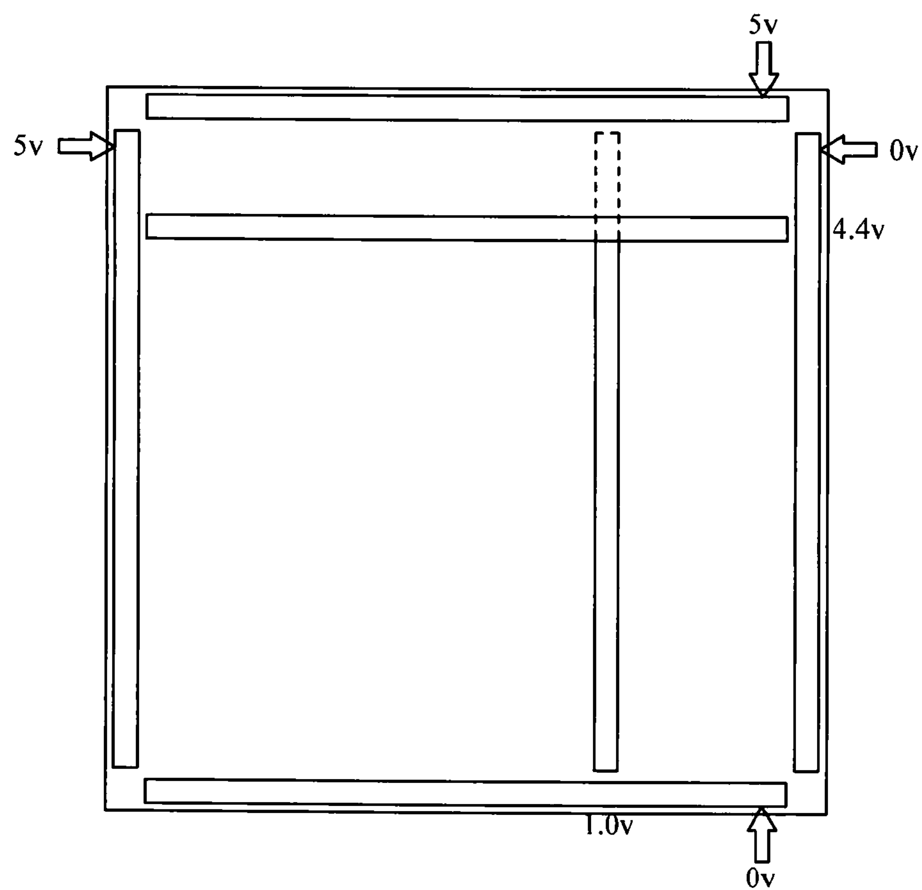
FIG. 2 is a top view showing the conventional resistive touch panel.
Figure 3:
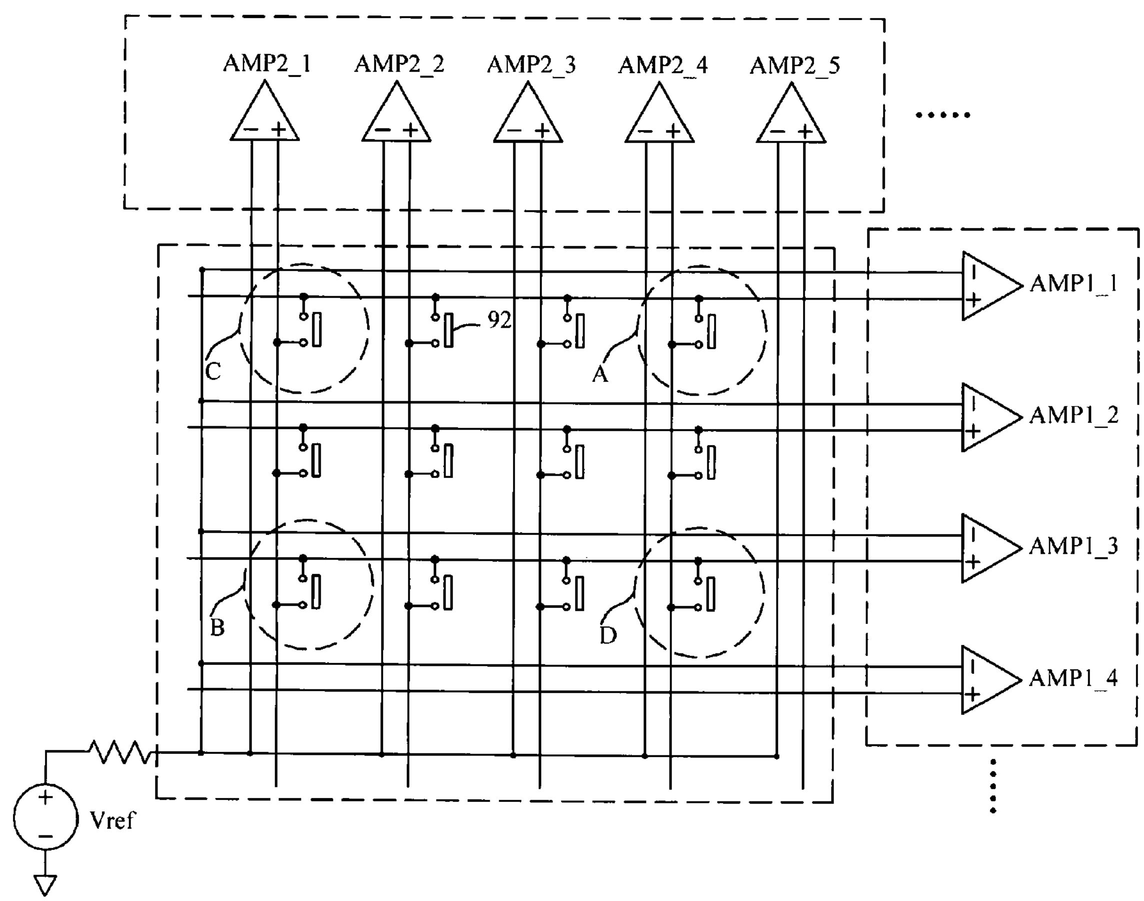
FIG. 3 is a system block diagram showing a touch panel disclosed in U.S. Patent Publication No. US-2008/0129898 A1.
Figure 4:
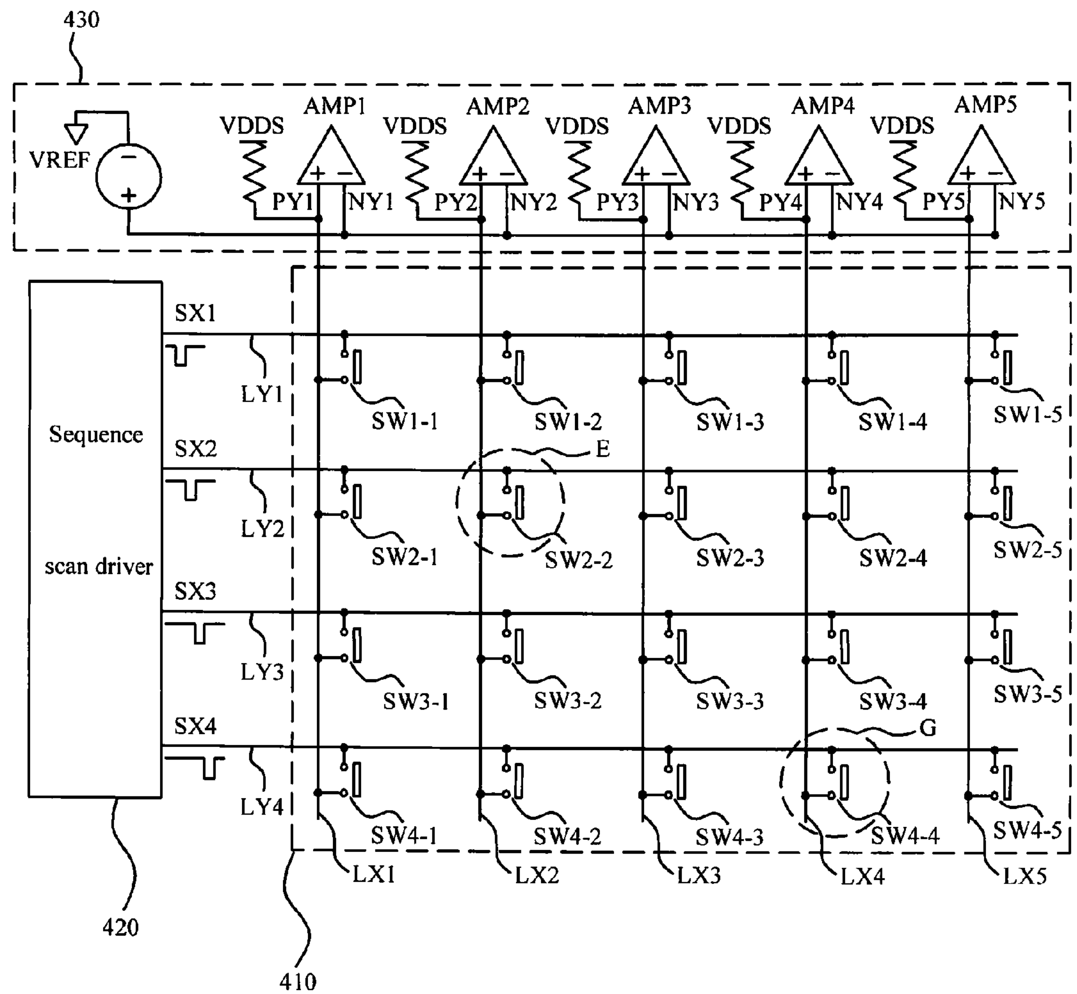
FIG. 4 is a system block diagram showing a touch panel according to an embodiment of the present invention.

FIG. 4 is a system block diagram showing a touch panel according to an embodiment of the present invention. Referring to FIG. 4, the touch panel includes a resistive pressure-sensing matrix 410, a sequence scan driver 420 and M X-axis sensing circuits 430. The resistive pressure-sensing matrix 410 includes M X-axis sensing lines and N Y-axis sensing lines. In order to facilitate the description of the embodiment, it is assumed, in this example, that the resistive pressure-sensing matrix 410 includes five X-axis sensing lines LX1 to LX5 and four Y-axis sensing lines LY1 to LY4.

When a user uses a tool, such as a touch pen or his/her finger, to press the touch panel, some blocks of the resistive pressure-sensing matrix 410 are pressed. In the pressed blocks, overlapped regions between the X-axis sensing lines and the Y-axis sensing lines are short-circuited. As for the behavior of the circuit, the overlapped region between the X-axis sensing line and the Y-axis sensing line may be regarded as a switch. Thus, the overlapped regions between the X-axis sensing lines and the Y-axis sensing lines are represented by switches SW1_1 to SW4_5 in the embodiment of FIG. 4. However, one of ordinary skill in the art should understand that the switches SW1_1 to SW4_5 may be formed by the circuit layout in the prior art, but are not the actual switch elements.

In order to make one of ordinary skill in the art understand and implement the present invention, five comparators are used to implement an X-axis sensing circuit 430 so that the spirit of the present invention may be described in detail. Referring to FIG. 4, the X-axis sensing circuit 430 includes five comparators AMP1 to AMP5. The comparators AMP1 to AMP5 include positive input terminals PY1 to PY5, negative input terminals NY1 to NY5 and output terminals. The negative input terminals NY1 to NY5 are coupled to a reference voltage VREF, and each of the positive input terminals PY1 to PY5 is coupled to a voltage source VDDS through a resistor. In addition, the positive input terminals PY1 to PY5 are also correspondingly coupled to five X-axis sensing lines of the resistive pressure-sensing matrix 410. The comparators AMP1 to AMP5 compare the voltages of the positive input terminals PY1 to PY5 with the voltages of the negative input terminals NY1 to NY5 to determine the voltages of the output terminals thereof.

The sequence scan driver 420 has four driving terminals respectively coupled to the Y-axis sensing lines LY1 to LY4 in the resistive pressure-sensing matrix 410. In addition, the sequence scan driver 420 sequentially outputs scanning voltages SX1 to SX4 from the driving terminals thereof. In other words, the sensing period of the touch panel is divided into four scanning periods. In the first scanning period, the first driving terminal of the sequence scan driver 420 outputs the scanning voltage SX1. Analogically, the fourth driving terminal of the sequence scan driver 420 outputs the scanning voltage SX4 in the fourth scanning period.

In order to facilitate the description of this embodiment, it is assumed that the reference voltage VREF is lower than the voltage of the voltage source VDDS. Therefore, when the resistive pressure-sensing matrix 410 is not pressed, the switches SW1_1 to SW4_5 are not turned on, and the voltage source VDDS having the high voltage are transferred to the positive input terminals PY1 to PY5 of the comparators AMP1 to AMP5 through the resistors. Therefore, the voltages of the positive input terminals PY1 to PY5 of the comparators AMP1 to AMP5 are higher than the voltages of the negative input terminals NY1 to NY5 so that the output terminals of the comparators AMP1 to AMP5 are kept at the positive saturation voltages. In addition, it is assumed that the scanning voltages SX1 to SX4 are low voltages.

When the region E of the resistive pressure-sensing matrix 410 is pressed, the X-axis sensing line LX2 and the Y-axis sensing line LY2 in the region E are short-circuited in the overlapped region therebetween, and the switch SW2_2 is turned on. In the second scanning period, the second driving terminal of the sequence scan driver 420 outputs the scanning voltage SX2. At this time, the switch SW2_2 is turned on so that the scanning voltage SX2 is outputted to the positive input terminal PY2 of the comparator AMP2 through the switch SW2_2 so that the positive input terminal PY2 of the comparator AMP2 is pulled down to the low voltage. When the positive input terminal PY2 of the comparator AMP2 is pulled down to the low voltage, the voltage of the positive input terminal PY2 of the comparator AMP2 is lower than the voltage of the negative input terminal NY2 so that the output terminal of the comparator AMP2 is converted into a negative saturation voltage. In the third scanning period, the output terminals of the comparators AMP1 to AMP5 return to the positive saturation voltages because the switches SW3_1 to SW3_5 are not turned on.

According to the above-mentioned operation, it is obtained that a controller of the touch panel detects that the output terminal of the comparator AMP2 is the negative saturation voltage only in the second scanning period. Therefore, the controller can obtain that the switch SW2_2 has been turned on, and thus determine the touch point touched by the user in the region E and obtain the coordinate of the touch point.

In addition, when the regions E and G of the touch panel are simultaneously pressed, the X-axis sensing line LX1 and the Y-axis sensing line LY3 are short-circuited in the overlapped region of the region E, and the X-axis sensing line LX4 and the Y-axis sensing line LY4 are short-circuited in the overlapped region of the region G so that the switches SW2_2 and SW4_4 are turned on. In the second scanning period, it is obtained, according to the above-mentioned operation, that the scanning voltage SX2 is outputted to the positive input terminal PY2 of the comparator AMP2 through the switch SW2_2, and the voltage of the positive input terminal PY2 of the comparator AMP2 is lower than the voltage of the negative input terminal NY2. Thus, the output terminal of the comparator AMP2 outputs the negative saturation voltage. Similarly, the scanning voltage SX4 is outputted from the switch SW4_4 to the positive input terminal PY4 of the comparator AMP4 in the fourth scanning period so that the output terminal of the comparator AMP4 is the negative saturation voltage.

According to the above-mentioned operation, it is obtained that the controller of the touch panel can judge that the switch SW2_2 has been turned on when the controller detects that the output terminal of the comparator AMP2 is the negative saturation voltage in the second scanning period. Thus, the controller can judge that the touch coordinate is (2,2). In the fourth scanning period, the controller detects that the output terminal of the comparator AMP4 is the negative saturation voltage, and can thus judge that the switch SW4_4 has been turned on. Thus, the controller can judge that the touch coordinate is (4,4). Consequently, after the second and fourth scanning periods, the controller obtains the coordinates (2,2), (4,4) of the two touch points F, G. According to the above-mentioned operation, it is obtained that when there are many touch points on the touch panel, the embodiment of the present invention still can correctly determine the positions of the touch points without the misjudgment phenomenon occurred in the prior art.

Figure 5:
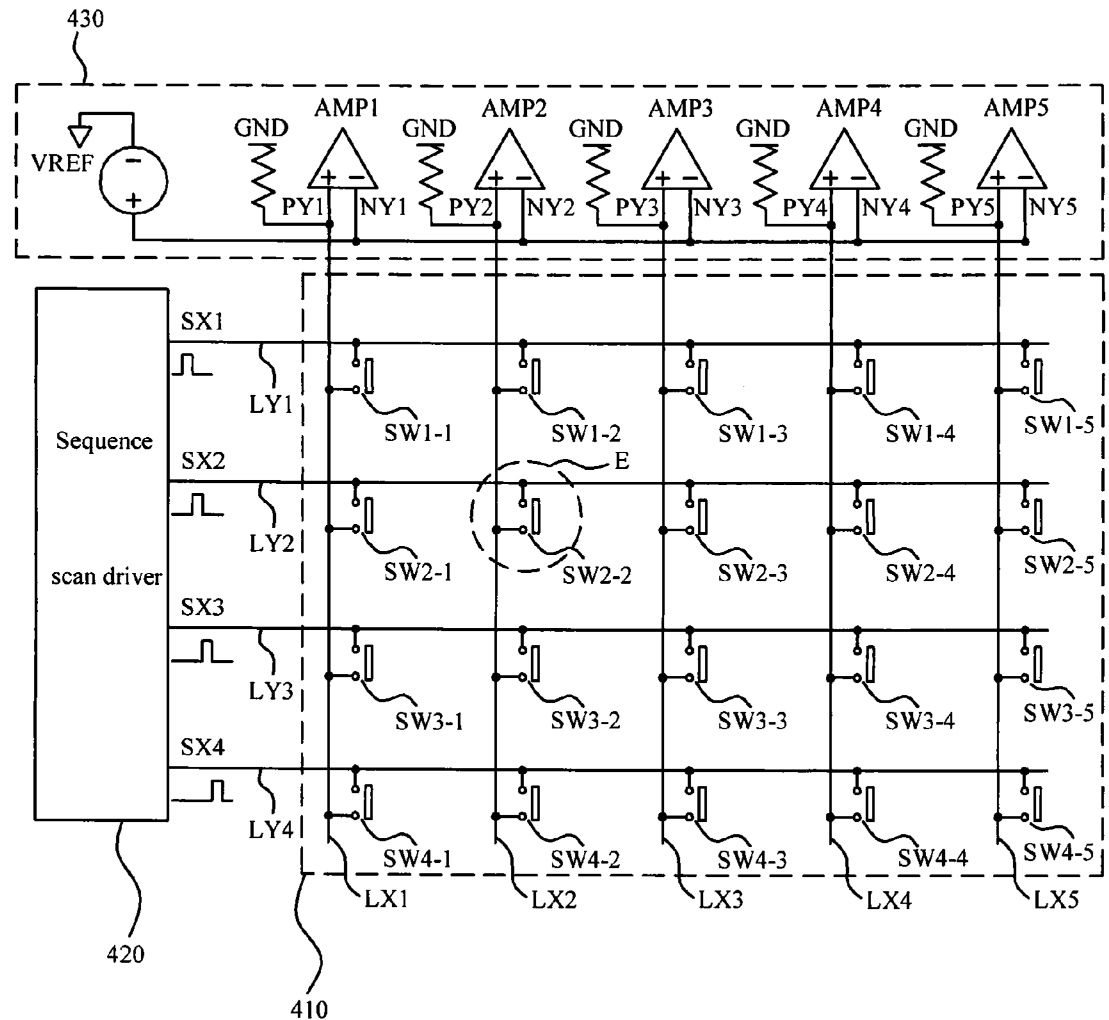
FIG. 5 is a system block diagram showing the touch panel according to the embodiment of the present invention.

In addition, FIG. 5 is a system block diagram showing the touch panel according to the embodiment of the present invention. Referring to FIG. 5, it is assumed that the scanning voltage outputted from the driving terminal of the sequence scan driver 420 is a high voltage, and the positive input terminals of the comparators AMP1 to AMP5 are coupled to the grounding voltage GND through the resistors in the above-mentioned embodiment, as shown in FIG. 5. The voltage of the reference voltage VREF is higher than the grounding voltage GND. Therefore, when the resistive pressure-sensing matrix 410 is not pressed, the voltages of the positive input terminals PY1 to PY5 of the comparators are lower than the voltages of the negative input terminals NY1 to NY5 so that the output terminals of the comparators AMP1 to AMP5 are kept at the negative saturation voltage. When the region E of the resistive pressure-sensing matrix 410 is pressed, the switch SW2_2 is turned on. In the second scanning period, the scanning voltage SX2 is outputted from the switch SW2_2 to the positive input terminal PY2 of the comparator AMP2 so that the voltage of the positive input terminal PY2 of the comparator AMP2 is converted into the high voltage and the voltage of the output terminal of the comparator AMP2 is converted into the positive saturation voltage. Consequently, the controller may detect that the voltage of the output terminal of the comparator AMP2 is converted into the positive saturation voltage in the second scanning period and thus determine the user's touch point in the region E and obtain the coordinate of the touch point.

Compared with US-2008/0129898 A1, the switches SW1_1 to SW4_5 are not applied with voltages. When the switches SW1_1 to SW4_5 are pressed, only the X-axis sensing lines and the Y-axis sensing lines in the pressed regions are short-circuited. In US-2008/0129898 A1, however, a sensor spacer is disposed in each of the overlapped regions between the X-axis sensing lines and the Y-axis sensing lines, and each sensor spacer is applied with a voltage. When a certain region is pressed, the sensor spacer in this region provides its voltage to the X-axis sensing line and the Y-axis sensing line.

Figure 6:
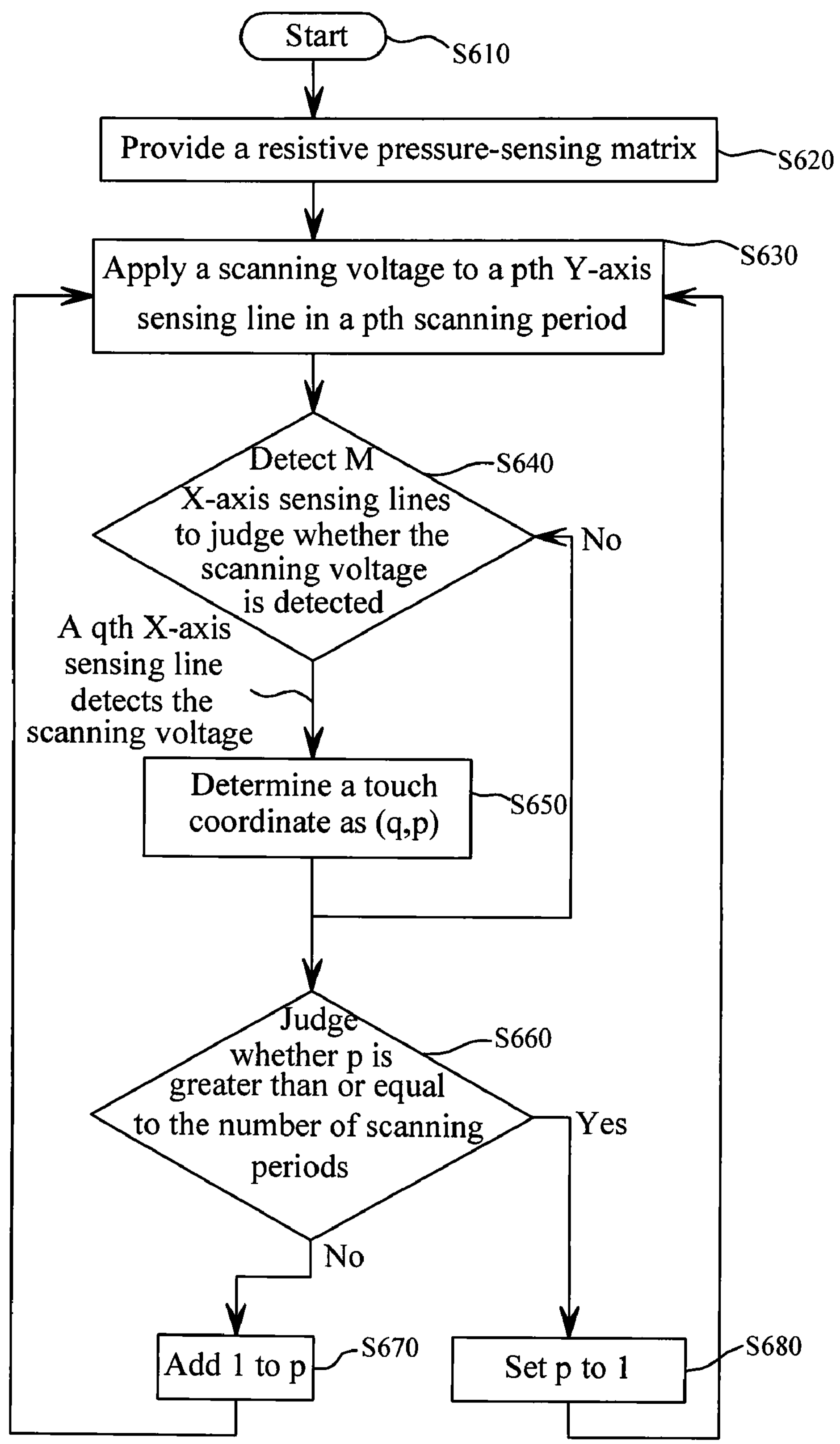
FIG. 6 is a flow chart showing steps in a method for detecting touch points according to the embodiment of the present invention.

According to the above-mentioned implementation, the method for detecting the touch points according to the present invention may be concluded in the following. FIG. 6 is a flow chart showing steps in a method for detecting the touch points according to the embodiment of the present invention. Referring to FIG. 6, the method includes the following steps.

In step S610, the touch detection according to the embodiment of the present invention is started.

In step S620, a resistive pressure-sensing matrix is provided. The resistive matrix includes M X-axis sensing lines and N Y-axis sensing lines, as shown in the above-mentioned embodiment. Similarly, when a preset range covering an overlapped region between the $i^{th}$ X-axis sensing line and the $j^{th}$ Y-axis sensing line of the resistive pressure-sensing matrix is pressed, the $i^{th}$ X-axis sensing line and the $j^{th}$ Y-axis sensing line are short-circuited.

In step S630, a scanning voltage is applied to the $p^{th}$ Y-axis sensing line in the $p^{th}$ scanning period, wherein the initial value of p is set to 1.

In step S640, the M X-axis sensing lines are detected to judge whether the scanning voltage is detected. According to the embodiment of FIG. 4, it is determined that the scanning voltage has been detected when the output terminals of the comparators AMP1 to AMP5 are detected as having the negative saturation voltages. In addition, according to the embodiment of FIG. 5, it is determined that the scanning voltage has been detected when the output terminals of the comparators AMP1 to AMP5 are detected as having the positive saturation voltages.

In step S650, when the scanning voltage on the $q^{th}$ X-axis sensing line of the M X-axis sensing lines is detected, the determined touch coordinate is (q, p). In addition, when no scanning voltage is detected on the M X-axis sensing lines, step S660 is directly performed.

In step S660, it is judged whether p is greater than or equal to the number of scanning periods (i.e., the number of scan lines). In the above-mentioned embodiment, the number of scanning periods is 4.

In step S670, if p is smaller than the number of scanning periods, 1 is added to p and the procedure goes back to the step S630.

In step S680, if p is greater than or equal to the number of scanning periods, p is set to an initial value (i.e., 1), and the procedure goes back to the step S630 to continue detecting the touch point.

In summary, the spirit of the present invention is to sequentially output the scanning voltages to the Y-axis sensing lines, and to detect whether the X-axis sensing lines receive the scanning voltages in each scanning period. Thus, the present invention has at least the following advantages.

First, the present invention can correctly detect the position of the touch point without misjudgment.

Second, because the present invention adopts the time-sharing multiplex technology to detect the touch point, the present invention only needs to add the sensing circuits on one axis so that the cost can be saved.

Third, when there are multiple touched points on the touch panel, the present invention still can correctly detect the position of each touched point without error.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A touch panel, comprising:

a resistive pressure-sensing matrix, which comprises M X-axis sensing lines and N Y-axis sensing lines, wherein an $i^{th}$ X-axis sensing line and a $j^{th}$ Y-axis sensing line are short-circuited when a preset range covering an overlapped region between the $i^{th}$ X-axis sensing line and the $j^{th}$ Y-axis sensing line of the resistive pressure-sensing matrix is pressed;

a sequence scan driver having N driving terminals respectively coupled to the N Y-axis sensing lines; and M X-axis sensing circuits, wherein:

a $k^{th}$ X-axis sensing circuit is coupled to a $k^{th}$ X-axis sensing line;

a sensing period of the touch panel is divided into N scanning periods, and a $p^{th}$ driving terminal of the sequence scan driver outputs a scanning voltage in a $p^{th}$ scanning period;

a $q^{th}$ X-axis sensing circuit receives the scanning voltage so that a touch coordinate is determined as (q, p) when the preset range covering the overlapped region between a $p^{th}$ Y-axis sensing line and a $q^{th}$ X-axis sensing line is pressed in the $p^{th}$ scanning period; and M, N, i, j, k, p and q are positive integers, i ranges between 1 and M, j ranges between 1 and N, k ranges between 1 and M, q ranges between 1 and M, and p ranges between 1 and N.

2. The touch panel according to claim 1, wherein each of the X-axis sensing circuits comprises a comparator, the comparator of the kth X-axis sensing circuit has a first input terminal, a second input terminal and an output terminal, the first input terminal is coupled to a reference voltage, the second input terminal is coupled to the kth X-axis sensing line, and the comparator compares a voltage of the kth X-axis sensing line with the reference voltage, and judges whether the scanning voltage is received according to a compared result.

3. The touch panel according to claim 1, wherein the sequence scan driver sequentially outputs the scanning voltages from the N driving terminals.

4. A method for detecting a plurality of touch points, the method comprising the steps of:

providing a resistive pressure-sensing matrix, which comprises M X-axis sensing lines and N Y-axis sensing lines, wherein an $i^{th}$ X-axis sensing line and a $j^{th}$ Y-axis sensing line are short-circuited when a preset range covering an overlapped region between the ith X-axis sensing line and the jth Y-axis sensing line of the resistive pressure-sensing matrix is pressed;

applying a scanning voltage to a $p^{th}$ Y-axis sensing line in a $p^{th}$ scanning period;

detecting the M X-axis sensing lines to judge whether the scanning voltage is detected; and determining a touch coordinate as (q, p) when a $q^{th}$ X-axis sensing line receives the scanning voltage in a $p^{th}$ scanning period, wherein M, N, i, j, p and q are positive integers, i ranges between 1 and M, j ranges between 1 and N, q ranges between 1 and M, and p ranges between 1 and N.

5. The method according to claim 4, wherein the step of detecting the M X-axis sensing lines to judge whether the scanning voltage is detected comprises:

providing a reference voltage; and comparing voltages of the X-axis sensing lines with the reference voltage.

* * * * *